United States Patent [19]
Ware

[11] 3,963,419

[45] June 15, 1976

[54] ANTIBACTERIAL LAUNDRY OIL AND DUST CONTROL COMPOSITION

[75] Inventor: Richard E. Ware, Trainer, Pa.

[73] Assignee: Sun Oil Company of Pennsylvania, Philadelphia, Pa.

[22] Filed: Apr. 15, 1974

[21] Appl. No.: 461,070

Related U.S. Application Data

[60] Division of Ser. No. 292,054, Sept. 25, 1972, Pat. No. 3,915,877, which is a continuation-in-part of Ser. No. 174,236, Aug. 23, 1971, abandoned.

[52] U.S. Cl. .................................... 8/142; 252/542; 252/88; 252/153

[51] Int. Cl.² .......................................... C09K 3/22

[58] Field of Search ............. 252/542, 88, 153, 148; 8/137, 142

[56] References Cited

UNITED STATES PATENTS

| | | | |
|---|---|---|---|
| 2,709,665 | 6/1955 | Campbell et al. | 252/88 X |
| 3,085,984 | 4/1963 | Degener et al. | 424/258 X |
| 3,531,414 | 9/1970 | Randell et al. | 252/542 |
| 3,577,215 | 5/1971 | Impullitti | 252/88 X |
| 3,740,190 | 6/1973 | Ware | 8/142 X |
| 3,915,877 | 10/1975 | Ware | 8/142 X |

OTHER PUBLICATIONS

Bergwein, Karl, *Chemical Abstracts*, 71: 40,608b.

*Primary Examiner*—Mayer Weinblatt
*Assistant Examiner*—Charles R. Wolfe, Jr.
*Attorney, Agent, or Firm*—J. Edward Hess; Donald R. Johnson; Anthony Potts, Jr.

[57] ABSTRACT

A laundry oil containing 0.02 to 2.0 weight percent 8-hydroxyquinoline as an antibacterial agent and the process of laundering mops and other fabrics used to wipe dust with such oil. In a preferred aspect of the invention the mops, etc. are laundered directly with the oil. When copper is present in the laundering apparatus the laundry oil preferably contains 0.0001 to 0.5 weight percent benzotriazole.

3 Claims, No Drawings

ANTIBACTERIAL LAUNDRY OIL AND DUST CONTROL COMPOSITION

CROSS REFERENCE TO RELATED APPLICATIONS

This application is a division of United States application Ser. No. 292,054, filed Sept. 25, 1972 and now U.S. Pat. No. 3,915,877; which application is a continuation-in-part of United States application Ser. No. 174,236, filed Aug. 23, 1971, and now abandoned.

BACKGROUND OF THE INVENTION

The present invention relates to new laundry oil composition containing a bactericide which is suitable for use in a combination oiling-laundering process, the process of laundering fabrics with this new laundry oil composition and the fabrics impregnated with the new laundry oil composition.

In the past oiled fabrics such as mops, dust cloths, walk-on mats, etc., have found widespread use due to their improved effectiveness in removing dust as compared with similar fabrics which have not been oiled. General practice has been to launder the soiled fabric using conventional water and a detergent or soap laundering followed by re-oiling of the fabric. More recently a process of laundering the soiled fabrics by immersing them in a clean warm (150°–180°F) laundry oil which is circulated past the fabrics to remove the soil has been developed. The soil particles are then removed from the laundry oil by filtration. The process offers numerous advantages such as reduced wear on fabrics during laundering and in reduced pollution since there is no detergent and oil removed during laundering to be disposed of. However, the bactericides previously used in the fabric impregnating oils have proven to be unsatisfactory for use in the new laundering oil impregnating process.

DESCRIPTION OF THE INVENTION

The fabrics which are conventionally impregnated with oil to aid in collecting dust include dust mops, dust cloths and walk-on rugs or mats. These fabrics are impregnated with oil so that when they are passed over a surface they will pick up and retain the dust and dirt on that surface. While there is little possibility of redepositing the dirt from one surface onto another surface being cleaned, there is a chance that microorganisms might be transferred. To deter such a transfer a bactericide is incorporated into the oil composition. There is almost always some moisture adsorbed on the surface of the dirt particles and it is this aqueous medium which contains microorganisms. Therefore, it is important that there be a migration from the oil impregnant in a dust control fabric to this aqueous phase in order to kill bacteria. Thus the laundry oil must contain within itself a miscible component which also can effectively migrate to the hydrous dirt particles. Water solubility and hydrocarbon miscibility are generally incompatible properties except through the use of coupling agents and in fact the imparting of antibacterial activity to an oil for this type of application has generally been regarded as not feasible.

It should be pointed out that oil alone reduces growth of most bacteria because it isolates them from their nutrient sources in the aqueous phase and also extracts vital components from their structures. However, the present invention is not concerned about such passive destruction of bacteria but rather a composition which actively destroys bacteria in dirt or aqueous phases in contact with the oil. Thus when a disc of fabric impregnated with the oil composition of the present invention is placed on a nutrient medium having a bacteria culture growing thereon the bacteria are killed not only under the disc of fabric but also in a ring around the fabric disc which ring in several mm. wide. This is known as bacteriostatic activity. Many of the usual bactericides such as ortho-phenyl phenol have been found to be ineffective for the present purpose in the concentrations desired. The salts of these compounds, such as sodium o-phenylphenate, would enhance bacteriostatic activity, but the metal salts are immiscible in hydrocarbon oils. The bactericide also must not give off noxious fumes because the operator removing the fabrics from the processing equipment will be exposed to such fumes. Thus formaldehyde, although it is quite active, is unsatisfactory. Other bactericides such as phenyl mercury oleate are unsatisfactory for the present purpose because they are too toxic to man.

It has been found that 8-hydroxyquinolines overcome all of the above-stated problems and impart satisfactory bacterial properties to laundry oils. This compound is used in amounts of from 0.02 to 2.0 wt. % as based on the total composition. While larger amounts can be used if desired they are unnecessary. This material surprisingly is quite effective against microorganisms although it has a very low toxicity to mammals. Taken orally in guinea pigs the $LD_{20}$ = 1.5 gms/Kgm. In the amounts used herein 8-hydroxyquinoline is relatively non-toxic.

The base oils of the present invention are mineral oils and can be either paraffinic or naphthenic. Generally they have a viscosity of from 60 to 600 SUS at 100°F.

Preferably the laundry oils of the present invention contain a dispersant to assist in removing aqueous soil from the dirty articles being cleaned. Generally the preferred dispersants are salts of alkyl sulfonates or salts or alkyl benzene sulfonates. In either case the molecular weight generally is from 300 to 600. The alkali metal salts are preferred. Generally from 0.5 to 3.0 wt. % as based on the total composition of the dispersant is used.

The laundry oil preferably contains an antioxidant in an amount of from 0.01 to 0.5 wt. % as based on the total composition. Butylated hydroxy toluene is a preferred antioxidant.

The laundry oil also preferably contains an odorant to impart a fresh clean smell thereto. "Alpine 16951"; a complex mixture of essential oils and aromatics supplied by Alpine Aromatics, Inc. of Metuchen, N.J. is exemplary of preferred odorants. Generally from 0.02 to 0.2 wt. % as based on the total composition is used.

The composition of the present invention is also useful as a conventional oil fabric impregnant.

The 8-hydroxyquinoline has the further advantage in that it acts as an antioxidant and improves the air stability of the oil at elevated temperatures. This is an important advantage particularly in view of the fact that most bactericides have a deleterious effect on the oxidative stability of the oil.

When the laundry oil composition of the present invention is used in an apparatus containing parts made of copper or copper alloys such as brass or bronze, the 8-hydroxyquinoline tends to complex with the copper and form a precipitate. Such parts may be pipes, pump parts or various fittings and structural members. This complexing results in a lessening of the bactericidal effectivenes of the 8-hydroxyquinoline. It has been found that while many metal deactivators such as butyl zimate and zinc dithiophosphate are ineffective, a small amount of 1,2,3-benzotriazole eliminates the problem without any adverse effect on the bactericidal activity of the 8-hydroxyquinoline. Generally from 0.0001 to 0.5 wt. % based on the total oil composition of the 1,2,3-benzotriazole is used.

EXAMPLE I

Fifty dirty mops are charged to a conventional laundry wheel having a 150 lb. capacity which is connected by piping to an oil reservoir, an oil filter and a heat exchanger. Clean warm oil (165°F) is continuously circulated from the reservoir into the laundry wheel containing the dirty mops and then through the filter back to the reservoir at a rate of 10 gal/min while the laundry wheel is operated. The oil level is half way up in the laundry wheel. The laundry oil contains 97.7 wt. % of a non-staining naphthenic mineral oil having a viscosity of 104 SUS at 100°F and 38 SUS at 210°F, 2.0 wt. % of "SUNAD E-0712" a commercial sodium sulfonate dispersant having a molecular weight of 440–470, 0.1 wt. % butylated hydroxy toluene (antioxidant), 0.1 wt. % of "Alpine 16951" odorant; and 0.1 wt. % of 8-hydroxyquinoline (antibacterial agent). After 30 minutes the oil is pumped out of the laundry wheel without recirculating it. The mops are then spun "dry" for 12 minutes and then are manually unloaded from the apparatus. The cleaned mops contain 35 to 40 weight percent oil but are dry to the touch and appear in excellent condition.

EXAMPLE II

A sample of 97.8 wt % oil of Example I, 2.0 wt. % sodium alkyl aryl sulfonates, 0.03 wt. % Alpine 16951 odorant and 0.1 wt. % butylated hydroxy toluene is prepared and various antibacterial agents are added at the 0.1 wt. % level, and the samples tested for bacteriostatic activity on both *E. coli* (gram +) and *S. aureus* (gram −) in accordance with AATCC90–1965, which is an agar plate test developed by the American Association of Textile Chemists and Colorants. The 8-hydroxyquinoline of the present invention is the only bacterial agent of those listed below having significant activity on both organisms. The others are: o-phenylphenol; hexahydro-1,3,5-triethyl-S-triazine; monoethyl ether of ethylene glycol; β-bromo-β-nitrostyrene; hexahydro-1,3,5-tris-(2-hydroxyethyl-S-triazine); benzoic acid; 2,3,4,6-tetrachlorophenol; butyl carbitol; ethylene glycol; tetrahydroacenaphthene; hexachlorophene; glutaraldehyde; propyl para-hydroxy benzoic acid; tributyl trioxide; 2,4-pentanedione; p-nitrophenol; disodium ethylene bis-dithiocarbamate; bis(2-hydroxy-5-chlorophenyl)sulfide; 4-bromoacetoxymethylene-m-dioxolane; hexetidine; myristyl dimethylbenzyl ammonium chloride; p-tertiary amyl phenol. The 8-hydroxyquinoline exhibits a clear zone of 18.5 mm. on *E. coli* and 15.5 mm. on *S. aureus* when subjected to the above test whereas there is no clear zone when the above-mentioned materials are tested.

EXAMPLE III

A sample of laundry oil containing 97.7 wt. % of the oil of Example I, 2.0 wt. % sodium alkyl aryl sulfonates, 0.3 wt. % Alpine 16951 odorant and 0.1 wt. % butylated hydroxy toluene is prepared. To this sample is added the amounts of 1,2,3-benzotriazole indicated below. The samples are then tested as in Example II. When so tested at the 0.1 wt. % and 0.001 wt. % level in the oil without the 8-hydroxyquinoline, the 1,2,3-benzotriazole did not exhibit any bactericidal activity. The aging done in the runs reported in the Table was done with the oil in a closed 4 oz. bottle in an oven. The copper used was a coil containing 36 inches of No. 18 copper wire.

TABLE

| RUN | | E. coli | S. aureus |
|---|---|---|---|
| | | Diameter of inhibitors zone in mm. | |
| 1 | Control 0 wt. % benzotriazole | 15.5 | 15.5 |
| 2 | 0.001 wt. % benzotriazole | 16.5 | 15.5 |
| 3 | Aged 4 weeks at 180°F control | 15.5 | 16.5 |
| 4 | Aged 4 weeks at 180°F control in presence of copper coil | 7.5 | 12.5 |
| 5 | Aged 4 weeks at 180°F, 0.001 wt. % benzotriazole | 16.5 | 15.5 |
| 6 | Aged 4 weeks at 180°F, 0.001 wt. % benzotriazole in presence of copper coil | 12.5 | 15.5 |
| 7 | Aged 4 weeks at 180°F in presence of 0.1 wt. % benzotriazole | 13.5 | 15.5 |
| 8 | Aged 4 weeks at 180°F in presence of 0.1 wt. % benzotriazole in presence of copper coil | 10.5 | 14.5 |

The invention claimed is:

1. A process of laundering fabrics comprising immersing said fabric in a laundry oil composition of a mineral oil containing from about 0.02 to about 2.0% by weight of 8-hydroxyquinoline which can effectively migrate to hydrous dirt particles, causing a flow of the oil composition with respect to the fabric whereby the oil composition removes soil particles from the fabric, and removing the soil particles from the oil by filtration.

2. The process of claim 1 wherein the fabric is in the form of a mop.

3. The process of claim 2 wherein the oil contains from 0.0001 to 0.5% by weight of 1,2,3-benzotriazole.

* * * * *